US012726890B2

(12) United States Patent
Penukonda et al.

(10) Patent No.: US 12,726,890 B2
(45) Date of Patent: Sep. 1, 2026

(54) CHANNEL SELECTION

(71) Applicant: Apple Inc., Cupertino, CA (US)

(72) Inventors: Lokanath Penukonda, Irvine, CA (US); Dongwoon Hahn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 181 days.

(21) Appl. No.: 18/473,156

(22) Filed: Sep. 22, 2023

(65) Prior Publication Data

US 2024/0107434 A1 Mar. 28, 2024

Related U.S. Application Data

(60) Provisional application No. 63/409,685, filed on Sep. 23, 2022.

(51) Int. Cl.
*H04W 48/16* (2009.01)
*H04W 48/20* (2009.01)
*H04W 72/40* (2023.01)

(52) U.S. Cl.
CPC .......... *H04W 48/16* (2013.01); *H04W 48/20* (2013.01); *H04W 72/40* (2023.01)

(58) Field of Classification Search
CPC .......... H04L 27/26025; H04W 72/232; H04W 72/0446
USPC .......... 370/329
See application file for complete search history.

(56) References Cited

U.S. PATENT DOCUMENTS

| | | | | |
|---|---|---|---|---|
| 10,432,375 | B1 * | 10/2019 | Kang | H04L 5/0048 |
| 2017/0208557 | A1 * | 7/2017 | Patil | H04W 56/001 |
| 2024/0137904 | A1 * | 4/2024 | Quan | H04W 4/02 |

* cited by examiner

*Primary Examiner* — Faisal Choudhury

(74) *Attorney, Agent, or Firm* — Kilpatrick Townsend & Stockton LLP

(57) ABSTRACT

The present application relates to devices and components including apparatus, systems, and methods to share channel maps between devices for channel selection for connections. A device may perform channel scanning operations for determining channel conditions and generating channel maps, and may provide the channel maps to other devices. The other devices can reduce channel scanning operations based on receiving the channel maps from the device.

20 Claims, 8 Drawing Sheets

CHANNEL SELECTION

CROSS-REFERENCE TO RELATED APPLICATIONS

This application claims the benefit of, and priority to, U.S. provisional application No. 63/409,685, entitled "OPTIMIZED CHANNEL SELECTION ALGORITHM," filed on Sep. 23, 2022, the disclosure of which is incorporated by reference herein in its entirety for all purposes.

TECHNICAL FIELD

The present application described herein relates to wireless communications such as Bluetooth® communications, including optimized channel selection methods and systems for wireless communications.

BACKGROUND

Devices that utilize wireless communications need to obtain information regarding channels for establishing wireless connections. For the example, the devices identify channels available at the location of the device and determine channel conditions for the channels. Each device may continually scan for the channels and channel conditions.

SUMMARY

This disclosure describes improved or optimized channel selection approaches, as well as systems and methods for executing the same, within a wireless communication network.

Implementations described herein can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the approaches described herein can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the approaches described herein are set forth in the accompanying drawings and the description below. Other features and advantages of the approaches described herein will be apparent from the description and drawings, and from the claims. While certain features of the currently disclosed approaches are described for illustrative purposes in relation to wireless communications, it should be readily understood that such features are not intended to be limiting. The claims that follow the detailed description are intended to define the scope of the protected subject matter.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail.

This disclosure describes example systems and methods that can avoid channel scanning and may re-use channel maps. In embodiments, the channel maps may provide channel condition information for one or more channels or a set of channels. Non-limiting example scenarios of where example systems and/or methods can be used include: 1) scatternet use cases; 2) from high/always powered devices; and/or 3) from high performance controller/chip that eliminates channel scanning between devices in close proximity/location based (ideally in a home environment). The approaches provided by the example methods and systems described herein can save battery power used for channel map selection and may improve performance of the devices and/or systems that implement the approaches.

In Bluetooth communication, a central device may keep scanning the air (or medium), or local environment, for good channels for connection and/or reconnection establishment and/or data exchange. Low power battery devices may desire to reduce the power expended on scanning. For example, it can be beneficial for devices having low power (either through a battery level being relatively low and/or a battery capacity being relatively low) to utilize power for other operations. In each reconnection and/or connection case when there is no active connection, a device may not know when the next connection is going to be created. Even when devices are in a connected state for long time, battery consumption reduction may be beneficial.

Figure 1:
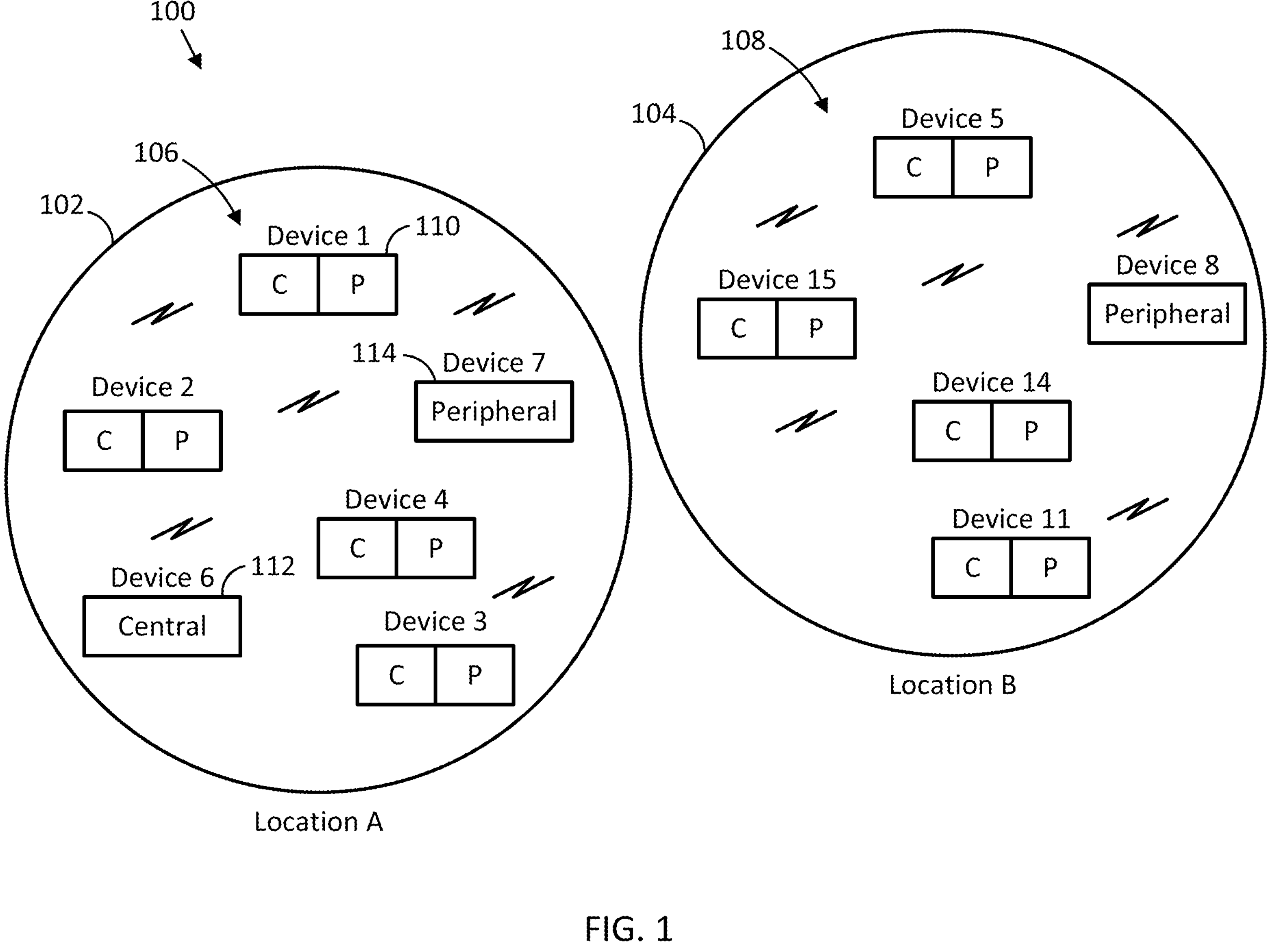
FIG. 1 illustrates an example system arrangement in accordance with some embodiments.

FIG. 1 illustrates an example system arrangement 100 in accordance with some embodiments. In particular, the system arrangement 100 illustrates a portion of an example system including a plurality of devices. In some embodiments, the devices may include Bluetooth devices and/or Bluetooth enabled devices.

The system arrangement 100 may include a first location 102 (which may be referred to as location A) and a second location 104 (which may be referred to as location B). The first location 102 and the second location 104 may be physical locations, where the first location 102 and the second location 104 may be physically separate. Locations of the first location 102 and the second location 104 may be defined based on geographic locations, locations of devices within the system, or some combination thereof.

The system arrangement 100 may include one or more devices. In the illustrated embodiment, a first portion 106 of the devices are located within the first location 102 and a second portion 108 of the devices are located within the second location 104.

Some devices have both central (C) and peripheral (P) roles and some can have only one role. For example, the devices within the system arrangement 100 may be configurable to operate in a central role, may be configurable to operate in a peripheral role, or may be configurable to operate in a central role and/or a peripheral role. For example, a first device 110 (which may be referred to as device 1) may be configurable to operate in a central role and/or a peripheral role, a second device 112 (which may be referred to as device 6) may be configurable to operate in a central role, and a third device 114 (which may be referred to as device 7) may be configurable to operate in a peripheral role in the illustrated embodiment. When a device is operating in a central role in legacy approaches, the device may scan for other devices and initiate connections with other devices. When a device is operating in a peripheral role in legacy approaches, the device may advertise and wait for connections.

Devices within the locations may experience similar channel conditions as each other. For example, the first portion 106 of the devices within the first location 102 may have the same or similar channels available and the devices may experience the same or similar channel conditions (such as signal strength and/or signal interference) for the channels. Further, the second portion 108 of the devices within the second location 104 may have the same or similar channels available and the devices may experience the same or similar channel conditions for the channels.

Figure 2:
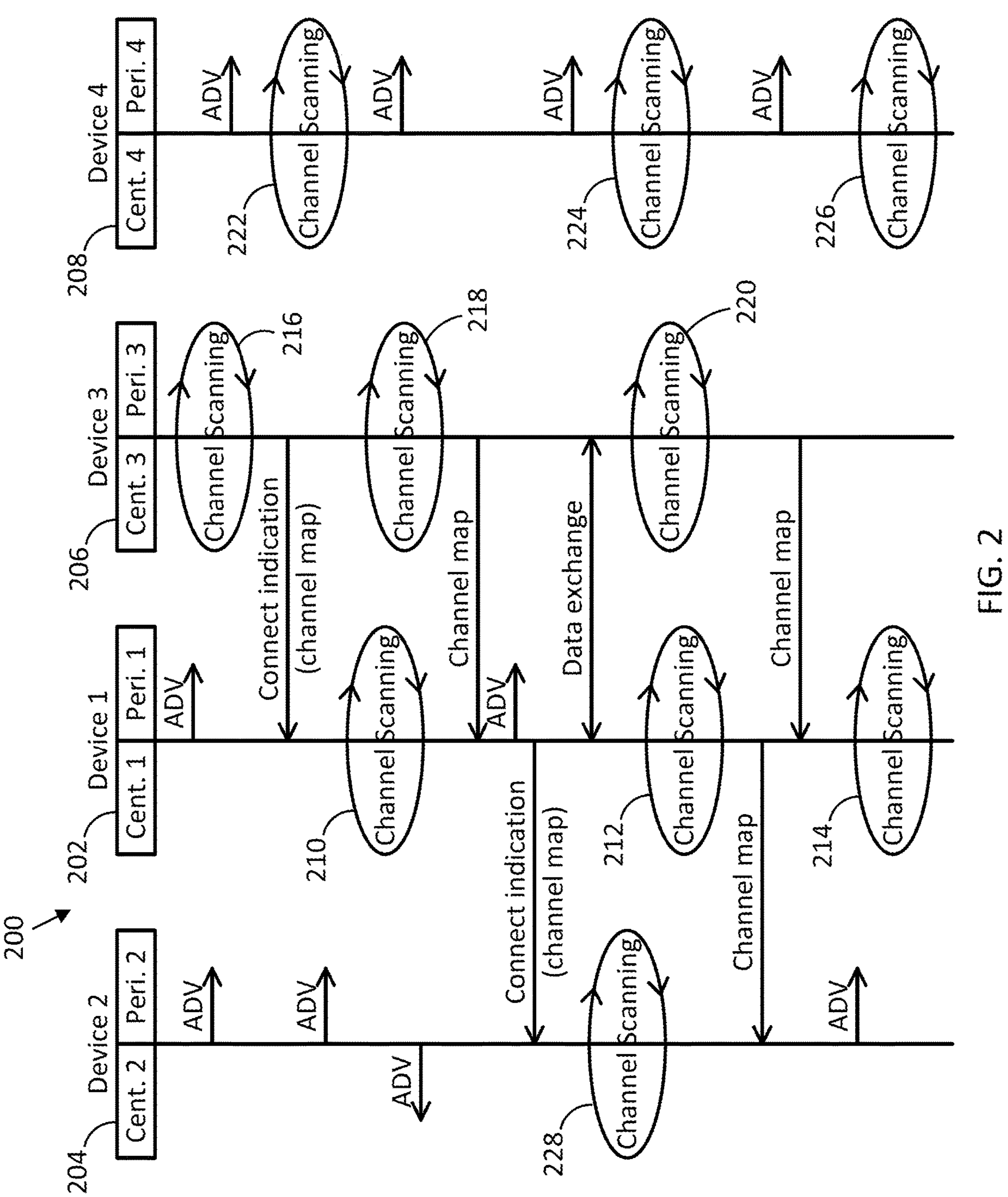
FIG. 2 illustrates an example of a system signaling arrangement in accordance with some embodiments.

FIG. 2 illustrates an example of a system signaling arrangement 200 in accordance with some embodiments. In particular, the system signaling arrangement 200 illustrates operations that may be performed by devices with a network, such as a Bluetooth network. The operations may include signals transmitted by the devices, signals exchanged between the devices, channel scanning operations, or other operations that may be performed by devices within a Bluetooth network. The system signaling arrangement 200 illustrates an example operation of devices in accordance with legacy approaches.

The system signaling arrangement 200 may include one or more devices. For example, the system signaling arrangement 200 includes a first device 202, a second device 204, a third device 206, and a fourth device 208 in the illustrated embodiment. The devices may include one or more of the features of the devices described in relation to the system arrangement 100 (FIG. 1). The devices may all be located in a single location, such as the first location 102 (FIG. 1) or the second location 104 (FIG. 1). The devices may be configured to operate in a central role, a peripheral role, or both a central role and a peripheral role. In the illustrated embodiment, the first device 202, the second device 204, the third device 206, and the fourth device 208 are configured to operate in the central role and the peripheral role.

A central device regularly scans (active/passive) the medium for good channels for (re)connection establishment/data exchange. For example, the devices configured to operate in a central role in the system signaling arrangement 200 continue to perform channel scanning operations for identifying channels and/or determining channel conditions for connection establishment and/or reconnection establishment, and/or for data exchange. Even if there is no active connection, a central device doesn't know when the next connection is going to be (or need to be) created. While a device is connected, it is required to evaluate channel conditions to maintain the existing link. Accordingly, the devices within the system signaling arrangement 200 are continually (or routinely) monitoring (through channel scanning) channel conditions, e.g., for possible connection establishment and/or to maintain one or more existing links.

In the illustrated embodiment, the first device 202 (which may be referred to as device 1) and the third device 206 (which may be referred to as device 3) continue to perform scanning operations, both before connection establishment and after the connection is established. The fourth device 208 (which may be referred to as device 4) may continue to perform scanning operations without an active connection. The central role in the second device 204 (which may be referred to as device 2) keeps scanning even though the peripheral role has connected to the first device 202. For example, the first device 202 may perform one or more channel scanning operations (such as channel scanning operation 210, channel scanning operation 212, and channel scanning operation 214 in the illustrated embodiment) before and after the first device 202 establishes connections. The third device 206 may perform or more channel scanning operations (such as channel scanning operation 216, channel scanning operation 218, and channel scanning operation 220 in the illustrated embodiment) before and after the third device 206 establishes connections. The fourth device 208 may perform one or more channel scanning operations (such as channel scanning operation 222, channel scanning operation 224, and channel scanning operation 226 in the illustrated embodiment) without establishing connections with other devices. The second device (which is operating in both a central role and a peripheral role) may have the central role operation continuing to perform one or more channel scanning operations (such as channel scanning operation 228) even though the peripheral role operation has established a connection with the first device 202.

Scanning duplication can be avoided, or reduced, by all central devices in a location. For example, the first device 202, the second device 204, the third device 206, and the fourth device 208 may all be located within proximity of one another (e.g., within effective communication range). Since devices within a common location can experience the same or similar channel conditions, the channel scanning operations (as part of the central role of the devices) performed by the first device 202, the second device 204, the third device 206, and the fourth device 208 may produce the same or similar results for channel conditions, thereby making the channel scanning operations by multiple devices duplicative. By avoiding the duplication of effort in the channel scanning operations, operation of the devices may be improved. For example, battery life and/or performance may be improved, e.g., by one or more devices avoiding performance of one or more duplicative channel scanning operations. The improved device battery life and/or performance may allow for performance of additional features, functions, and/or operations, extended use cases, improved quality of existing use cases, and/or additional support for low performance chipset/controllers.

Figure 3:
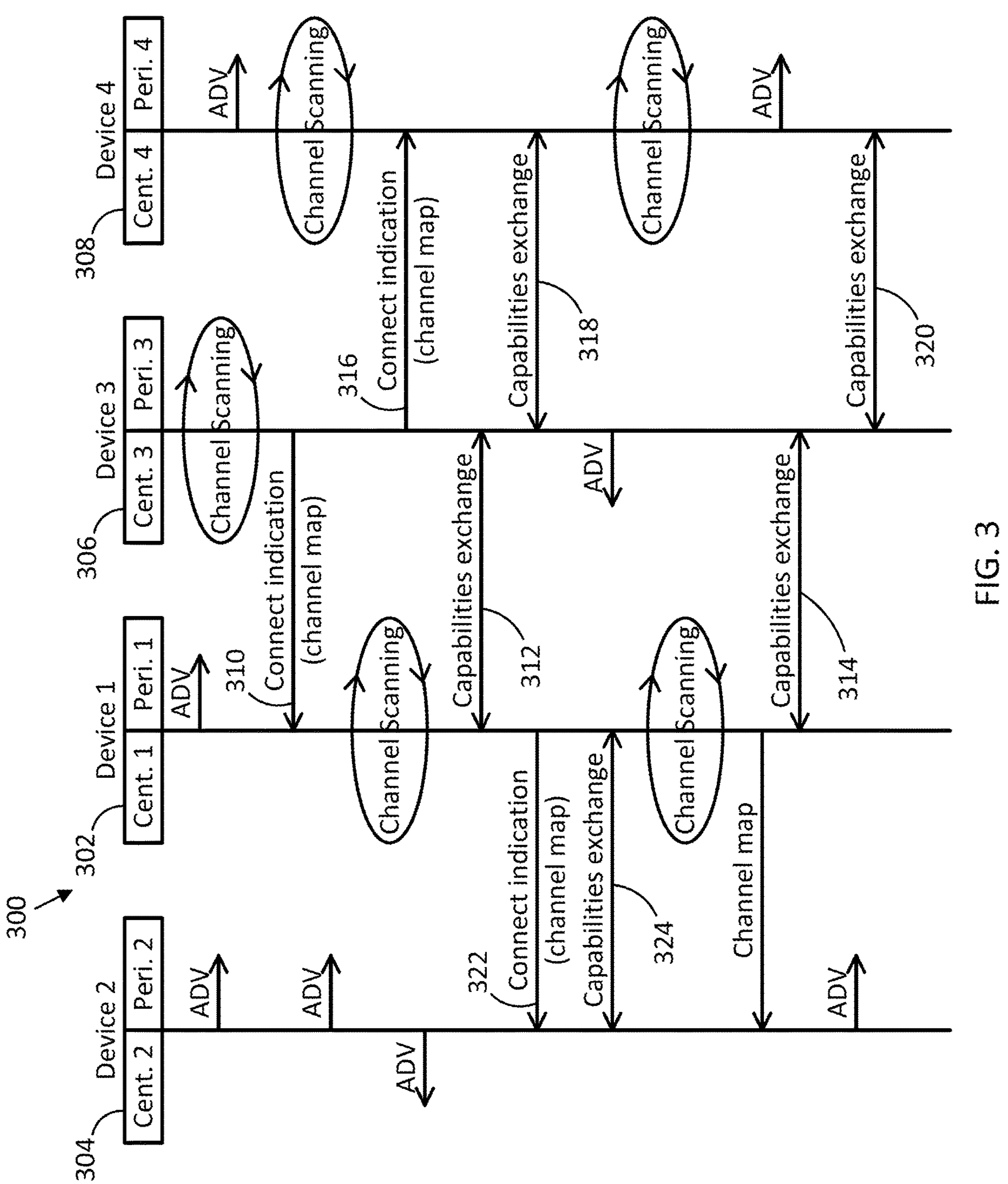
FIG. 3 illustrates an example of a system signaling arrangement in accordance with some embodiments.

FIG. 3 illustrates an example of a system signaling arrangement 300 in accordance with some embodiments. The system signaling arrangement 300 illustrates an example of a device ranking approach as can be utilized in accordance with the channel map sharing approaches described throughout this disclosure. The device ranking approach described in relation to the system signaling arrangement 300 may produce a ranking for determining a primary device for sharing channel maps between devices.

The system signaling arrangement 300 may include one or more devices. For example, the system signaling arrangement 300 includes a first device 302, a second device 304, a third device 306, and a fourth device 308 in the illustrated embodiment. The devices may include one or more of the features of the devices described in relation to the system arrangement 100 (FIG. 1), the first device 202 (FIG. 2), the second device 204 (FIG. 2), the third device 206 (FIG. 2), and/or the fourth device 208 (FIG. 2). The first device 302, the second device 304, the third device 306, and the fourth device 308 may be located within a single location, such as the first location 102 (FIG. 1) or the second location 104 (FIG. 1).

Once devices are connected, they may exchange with each other information regarding one or more capabilities using messages. The messages may be proprietary in some embodiments and standardized in others. The capabilities information may include indications such as Bluetooth processor/chip revision, battery powered (large/low capacity), wired connection (or persistently) powered, and/or user preference/setting information (e.g., battery power mode/game mode, etc.).

For example, the third device 306 may establish a connection with the first device 302 in the illustrated embodiment, as indicated by connect indication 310. Once the connection has been established between the third device 306 and the first device 302, one or more messages may be exchanged between the third device 306 and the first device 302 that include capabilities of the third device 306, capabilities of the first device 302, capabilities of other devices connected to the first device 302 and/or the third device 306, or some combination thereof. For example, the first device 302 and the third device 306 perform a first capabilities exchange 312 and a second capabilities exchange 314 in the illustrated embodiment, where each of the capability exchanges include one or more messages that include indications of capabilities of devices. In some embodiments, the messages included in the capability exchanges may be proprietary messages.

Further, the third device 306 may establish a connection with the fourth device 308 in the illustrated embodiment, as indicated by connect indication 316. Once the connection has been established between the third device 306 and the fourth device 308, one or more messages may be exchanged between the third device 306 and the fourth device 308 that include capabilities of the third device 306, capabilities of the fourth device 308, capabilities of other devices connected to the fourth device 308 and/or the third device 306, or some combination thereof. For example, the fourth device 308 and the third device 306 perform a third capabilities exchange 318 and a fourth capabilities exchange 320 in the illustrated embodiment, where each of the capability exchanges include one or more messages that include indications of capabilities of devices. In some embodiments, the messages included in the capability exchanges may be proprietary messages.

The first device 302 may establish a connection with the second device 304 in the illustrated embodiment, as indicated by connect indication 322. Once the connection has been established between the first device 302 and the second device 304, one or more messages may be exchanged between the first device 302 and the second device 304 that include capabilities of the first device 302, capabilities of the second device 304, capabilities of other devices connected to the first device 302 and/or the second device 304, or some combination thereof. For example, the first device 302 and the second device 304 perform a fifth capabilities exchange 324 in the illustrated embodiment, where each of the capability exchanges include one or more messages that include indications of capabilities of devices. In some embodiments, the messages included in the capability exchanges may be proprietary messages. In some embodiments, standardized messages or some combination of proprietary and standardized messages may be used.

Using the capability information, devices may be ranked to select a primary device. For example, the devices can be ranked from highest to lowest based on processor/chip revisions (such as Bluetooth processor chip revisions or versions), battery power characteristics (such as battery levels of the devices, battery capacities of the devices (such as large capacity or low capacity), battery usage/performance, or some combination thereof), power source (such as being battery powered and/or persistently powered through a wired connection), and/or user preferences (such as a battery power mode for the devices and/or a game mode for the devices). In some embodiments, the different factors used for ranking the devices may be provided with different weights in ranking the devices from highest to lowest. The system may select the device having the highest ranking as the primary device.

Primary device scanning may be used to generate one or more channel maps, which may be shared with one or more other devices in that location. For example, the device selected as the primary device (which may be referred to as the primary device while selected) may continue to perform channel scanning operations. The primary device may generate one or more channel maps representing the channel conditions determined from the channel scanning operations. The channel maps generated by the primary device may be shared with one or more devices in the same location (e.g., within effective communication range or another range over which channel conditions are deemed sufficiently similar) as the primary device. For example, a channel map generated by a primary device selected from the first device 302, the second device 304, the third device 306, and the fourth device 308 may be shared with the others of the first device 302, the second device 304, the third device 306, and/or the fourth device 308.

If the primary device exits/leave the location, another device may be designated as the primary. For example, if the device that is selected as the primary device becomes unavailable (such as exiting the location, being moved outside of the location, and/or being powered down), a secondary device, e.g., with the next highest ranking in the location, may be selected to be the new primary device (which may be the device with the highest ranking after the former primary device became unavailable). Device rankings may be updated and/or shared with other devices in a location, e.g., periodically and/or when a known device (bonded/cloud paired) enters/exits the location.

For clarity purposes, the first device 302 may be ranked first, the second device 304 may be ranked second, the third device 306 may be ranked third, and the fourth device 308 may be ranked fourth in the illustrated embodiment. Based on the first device 302 being ranked first (which is the highest rank), the first device 302 may be selected as the primary device. If the first device 302 becomes unavailable, the second device 304 may be selected as the new primary device based on the second device 304 having being ranked second (e.g., the highest ranked remaining device).

The ranking may be done centrally or in a distributed manner. In central ranking, the primary device of a location may determine the ranking of the other devices within that location, and the primary device may designate a replacement primary device if it becomes unavailable (for example, has to be turned off or cannot provide channel map for other devices). For example, as the first device 302 is ranked highest and selected as the primary device in illustrated embodiment, the first device 302 may gather and maintain capability information for the devices in the location (including the second device 304, the third device 306, and the fourth device) in the central way of ranking. The first device 302 may determine rankings of the devices based on the capability information. The first device 302 may designate another device as the replacement primary device if the first device 302 becomes unavailable (such as transmitting an indication to the new primary device when the first device 302 is being turned off or leaving the location, or advanced notification that the replacement primary device is to assume the primary role if it detects the primary device has departed).

In the distributed way, the ranking is maintained by each device, and each device will know if it is a primary device. For example, all of the devices (or all of the connected devices in some embodiments) in a location may gather and maintain capability information for the devices within the location. Each of the devices may determine rankings for the devices within the location based on the capability information. A device may determine whether it is to operate as the primary device based on the rankings it has determined. For example, the device may determine that it is to operate as the primary device when it has the highest ranking in the location, and the device may determine that it is to operate as a non-primary device (which may be referred to as a secondary device) when it is not the highest ranking device in the location.

In some implementations, the following process can be executed: Procedure: 1. Copy the channel maps received in peripheral role and reuse them in central for connection establishment or data transfer. For example, a device may receive a channel map from another device for the peripheral role of the device, and may utilize the channel map for connection establishment and/or data transfer as part of the central role of the device. The channel maps may be exchanged between devices using proprietary message in accordance with the second optimized scanning approach when the devices are connected. If the devices are not connected, advertisements with a channel map as one of a proprietary field may be received from an identified primary device, such as in the first optimized scanning approach. 2. The devices may identify high/always powered devices to relay channel maps to save battery in some embodiments. 3. In some embodiments, the devices may identify the high-performance controller/chip to relay channel maps for better performance. 4. A primary device may use location (global positioning system (GPS)/received signal strength indicator (RSSI) based) to identify one or more devices with which to share channel maps. The devices can selectively offload this activity to other devices to save power and/or can select a better device for performing the activity. Some advantages to this process may include that it may save battery for channel map selection and may improve performance.

Figure 4:
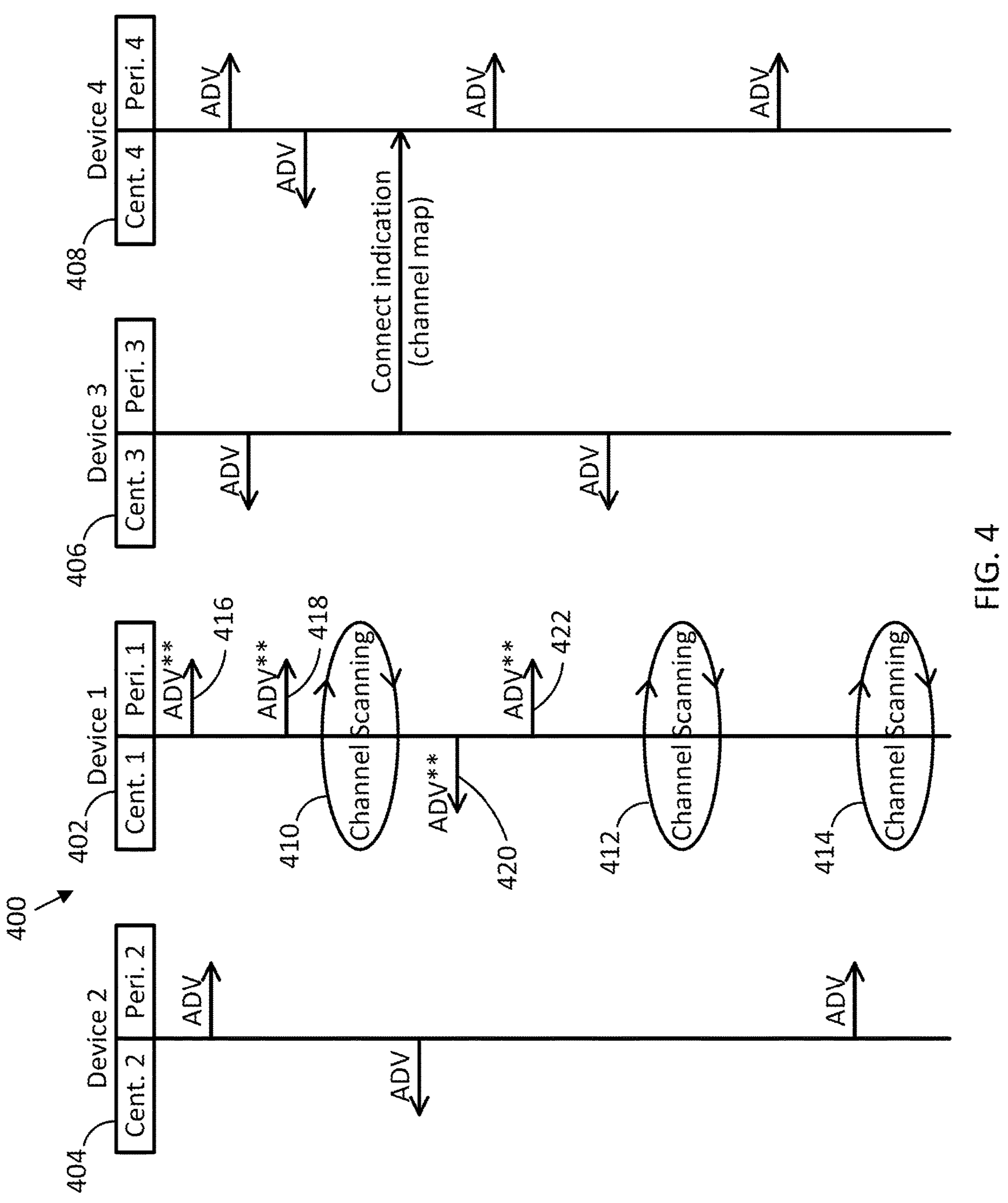
FIG. 4 illustrates an example of a system signaling arrangement in accordance with some embodiments.

FIG. 4 illustrates an example of a system signaling arrangement 400 in accordance with some embodiments. The system signaling arrangement 400 illustrates a first optimized scanning approach that may be utilized for sharing channel maps. The first optimized scanning approach can be implemented for devices that are located nearby (such as being located within a single location) where connections have not been established between the devices.

The system signaling arrangement 400 may include one or more devices. For example, the system signaling arrangement 400 includes a first device 402, a second device 404, a third device 406, and a fourth device 408 in the illustrated embodiment. The devices may include one or more of the features of the devices described in relation to the system arrangement 100 (FIG. 1), the first device 202 (FIG. 2), the second device 204 (FIG. 2), the third device 206 (FIG. 2), the fourth device 208 (FIG. 2), the first device 302 (FIG. 3), the second device 304 (FIG. 3), the third device 306 (FIG. 3), and/or the fourth device 308 (FIG. 3). The first device 402, the second device 404, the third device 406, and the fourth device 408 may be located within a single location, such as the first location 102 (FIG. 1) or the second location 104 (FIG. 1).

From the device ranking, the first device 402 (which may be referred to as device 1) can be selected as primary device for scanning and sharing channel maps in its advertisements. For example, the first device 402 may be determined to have a highest rank in the location in accordance with the ranking approach described in relation to the system signaling arrangement 400. Based on the first device 402 being the highest ranked device in the location, the first device 402 may be selected to operate as the primary device for the location.

The primary device in the location may perform channel scanning operations to determine channel conditions for one or more channels detectable by the primary device. For example, the first device 402 may perform a first channel scanning operation 410, a second channel scanning operation 412, and a third channel scanning operation 414 in the illustrated embodiment. The primary device may generate one or more channel maps that indicate the channel conditions corresponding to the one or more channels.

The primary device in the location may share the channel maps with other devices in the location via advertisements. For example, the primary device may transmit one or more advertising packets that includes at least a portion of a channel map. In the illustrated embodiment, the first device 402 may transmit a first advertisement 416, a second advertisement 418, a third advertisement 420, and/or a fourth advertisement 422. Each of the advertisements may include at least one advertisement packet, where each of the advertisement packets may include at least a portion of a channel map generated by the first device 402.

The other devices not selected as the primary device (which may be referred to as secondary devices) may reduce or suspend channel scanning operations. For example, other devices stop all scanning activity and listen to the advertisements from the primary device (which is the first device 402 in the illustrated embodiment) only when needed. For example, the second device 404, the third device 406, and the fourth device 408 may be operating as secondary devices in the illustrated embodiment. Based on the second device 404, the third device 406, and the fourth device 408 operating as secondary devices, the second device 404, the third device 406, and the fourth device 408 may not perform channel scanning operations or may reduce the amount and/or frequency of their own channel scanning operations. The second device 404, the third device 406, and the fourth device 408 may listen for advertisements from the first device 402 that include the at least the portion of the channel map when channel condition information is needed.

The primary device will share channel maps with other devices in proximity opportunistically, without incurring additional scanning or advertising overhead. For example, the frequency at which the channel scanning operations are performed by the primary device may be unchanged from the frequency that would be implemented for the primary device when operating individually. Additionally, the scheduling and/or frequency of the transmission of advertisements by the primary device may be the same as if the device was not selected as the primary device.

The channel map payload can be added to advertising packets in the already active advertising instances as long as there is room to add this payload. For example, the first device 402 may add a payload that includes at least a portion of a channel map to the first advertisement 416, the second advertisement 418, the third advertisement 420, and/or the fourth advertisement 422, where there is room for the payload. In some embodiments, the payload may include between 5 and 10 bytes for channel map, length and type in the simplest case. If more channel information (signal-to-noise ratio (SNR), received signal strength indicator (RSSI), etc.) is to be included in the payload, the payload may be longer. In some instances, the channel map payload may fit only in extended advertising packets. The payload can be reduced to occupy less than 5 bytes by having channel condition/indication information for only alarming (or alerting) channels. The alarming channels may include channels that present bad channel conditions (such as being below a minimum quality threshold) and/or channels that should not be utilized for connections.

In some embodiments, one or more of the secondary devices (the devices not selected as the acting primary device), may operate in a leaching scanning mode. For leaching scanning only; do not scan for this payload only, but use the scanning results done for others. For example, the secondary devices operating in leaching scanning mode may not initiate a scan for advertisements from the primary device solely for the purpose of obtaining the payload including the channel map. Instead, the secondary devices operating in the leaching scanning mode may initiate advertisement scanning for reasons other than obtaining the channel map, but can also obtain the advertisement with the channel map payload during these scanning operations.

Once the first device 402 becomes unavailable (for example, exits from this location), the second device 404 may be selected as the primary device and the first device 402 may stop sending channel maps in its advertisements. A benefit of non-connection method over conventional methods may include that it is easier to share the channel information with multiple devices in proximity, e.g., by broadcasting. For example, the primary device may broadcast and/or multicast advertisements that can be received by multiple devices within its effective communication range.

Figure 5:
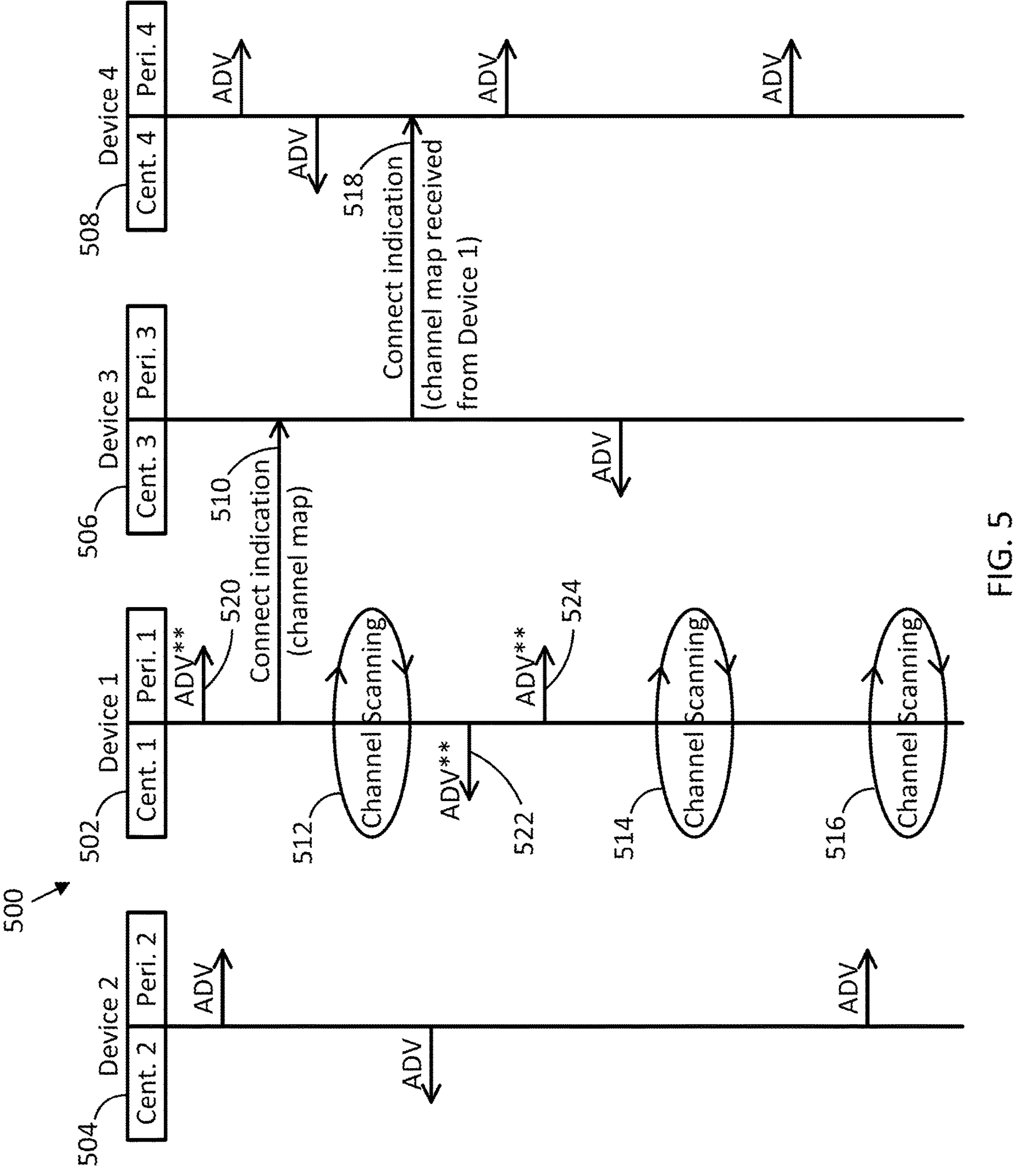
FIG. 5 illustrates an example of a system signaling arrangement in accordance with some embodiments.

FIG. 5 illustrates an example of a system signaling arrangement 500 in accordance with some embodiments. The system signaling arrangement 500 illustrates a second improved scanning approach that may be utilized for sharing channel maps. The second improved scanning approach can be implemented for devices that have established connections. The devices may implement the second improved scanning approach by itself or in combination with the first improved scanning approach described in relation to the system signaling arrangement 400 (FIG. 4).

The system signaling arrangement 500 may include one or more devices. For example, the system signaling arrangement 500 includes a first device 502, a second device 504, a third device 506, and a fourth device 508 in the illustrated embodiment. The devices may include one or more of the features of the devices described in relation to the system arrangement 100 (FIG. 1), the first device 202 (FIG. 2), the second device 204 (FIG. 2), the third device 206 (FIG. 2), the fourth device 208 (FIG. 2), the first device 302 (FIG. 3), the second device 304 (FIG. 3), the third device 306 (FIG. 3), the fourth device 308 (FIG. 3), the first device 402 (FIG. 4), the second device 404 (FIG. 4), the third device 406 (FIG. 4), and/or the fourth device 408 (FIG. 4). The first device 502, the second device 504, the third device 506, and the fourth device 508 may be located within a single location, such as the first location 102 (FIG. 1) or the second location 104 (FIG. 1).

In case of connected operation, channel maps received in one or more peripheral connections will be reused in a central connection. For example, a device may be configured to operate in both a central role and a peripheral role. Another device may establish a connection with the device as part of the peripheral role of the device. As part of establishing the connection, the other device may provide a channel map to the device. The device, as part of the central role, may utilize the information associated with the received channel map as part of the peripheral role for establishing connections with other devices. Further, in some embodiments, the device may provide the channel map to one or more other devices with which the device is establishing connections.

As illustrated in the system signaling arrangement 500, the first device 502 (which may be referred to as device 1) (central 1) is connected to the third device 506 (which may be referred to as device 3)(peripheral 3). For example, the first device 502, as part of the central role of the first device 502, may establish a connection with the third device 506, as part of the peripheral role of the third device 506. The first device 502 may establish a connection with the third device 506 by transmitting a connect indication 510 to the third device 506. The connect indication 510 may include a channel map generated by the first device 502 based on one or more channel scanning operations performed by the first device 502 (such as the first channel scanning operation 512, the second channel scanning operation 514, and/or the third channel scanning operation 516).

The channel map received from the first device 502 may be reused in connection with the fourth device 508 (which may be referred to as device 4). For example, the third device 506, as part of the central role of the third device 506, may establish a connection with the fourth device 508, as part of the peripheral role of the fourth device 508. The third device 506 may establish a connection with the fourth device 508 by transmitting a connect indication 518 to the fourth device 508. The connect indication 518 may include the channel map received by the third device 506 from the first device 502.

The approaches can further include providing channel maps only when the channel information accompanies one or more other data packets. For example, a connect indication (such as the connect indication 510 and/or the connect indication 518) utilized for establishing connections may include channel map information only when one or more other data packets, in addition to the channel map information, are included within the connect indication. Otherwise, the message containing only channel map information may wake up the application processor (AP), thereby causing it to consume power. For example, it may be beneficial for power conservation to avoid transmitting the channel map without one or more accompanying data packets to prevent an AP from waking up solely to process the channel map. Accordingly, a device may determine whether other data packets are to be included in a transmission prior to including the channel map in the transmission.

In this approach, there can be multiple scanning results of channel maps. For example, a device may receive channel maps and/or may receive channel conditions used for generating channel information in different ways. Approaches may use a different weight for the channels directly scanned vs. channel information from other sources. In some embodiments, a higher weight may be accorded to the channels directly scanned. For example, some devices within a system may perform channel scanning operations to determine channel conditions for generating channel maps and may receive channel maps from other devices. The devices may assign a higher weight to the channel maps generated from the channel conditions produced by performing channel scanning operations than a weight assigned to channel maps received from the other devices. For example, the first device 502 may perform channel scanning operations to determine channel conditions for generating channel maps in the illustrated embodiment. Additionally, the first device 502 may receive channel maps from other devices as the other devices establish a connection with the first device 502. The first device 502 may assign a higher weight to the channel maps generated based on the channel scanning operations performed by the first device 502 than the channel maps received from the other devices.

In some embodiments, approaches may use different weights for channel maps received from other devices based on the distance between the device providing the channel map and the device receiving a channel map. For example, a devices exchanging a channel map located at a first distance may be assigned a higher weight than devices exchanging a channel map located at a second distance that is greater than the first distance.

Between channel maps received from one or more peripheral connections and from channel maps included in advertisements, a last received (e.g., most recently received) channel map may have the higher weight. For example, a device may receive a channel map as a part of connection establishment with another device, such as a channel map being included in a connect indication. The device may also receive one or more advertisements including a channel map from a primary device within the location. The device may assign the channel map that has been most recently received a higher weight than earlier received channel maps, e.g., previously received via an advertisement or connection establishment. For example, the third device 506 may receive a channel map within the connect indication. Further, the third device 506 may receive a channel map in an advertisement from the first device 502 (such as a first advertisement 520, a second advertisement 522, and/or a third advertisement 524). The third device 506 may assign a higher weight to whichever channel map was received most recently.

There may be a tradeoff in power and accuracy of channel information between 1) locally scanning channels to determine a channel map and 2) receiving channel information from one or more nearby devices. Each method may consume different levels of power, e.g., in scanning and receiving operations. Further, the channel information from a nearby device may be less accurate than the channel information obtained from local scanning, e.g., due to differences caused by orientation, blockers, obstructions, interference, etc.

In some embodiments, a device may dynamically determine where to get channel information, such as from 1) local scanning and/or 2) receiving from nearby devices based on its condition, such as battery level, persistent power status, battery capacity, operational load, quality of service (QoS) requirements, etc. For example, a device may determine whether to perform a channel scanning operation itself to detect channel conditions or to obtain a channel map from another device (such as via receiving the channel map in an advertisement or receiving the channel map in a connect indication) based on the device's battery level, whether the device is connected to wall-power (a persistent power source), the device's battery capacity, the device's current or predicted operational load, the device's current or predicted processing requirements, other factors that influence device performance, or any combination thereof.

In some implementations, the device may combine the channel information obtained from 1) local scanning and 2) nearby devices. Further, in some implementations, the device may give more weight to channel information determined through local scanning and/or assign a lower weight to channel information obtained from one or more nearby devices. For example, the device may assign higher weight to channel maps generated based on channel scanning operations than weights assigned to channel maps received from other devices. Additionally, in some implementations, a device may increase the weight assigned to channel information independently obtained from two or more devices. The device may utilize the assigned weights and the channel maps to determine a combined channel map, e.g., based on the channel maps generated through the channel scanning operations and the channel maps received from other devices.

Depending on the estimate of power consumed by 1) local scanning and/or 2) receiving messages from nearby devices, a device may control the frequency for 1) the local scanning and/or 2) the receiving from nearby devices. As receiving channel maps from nearby devices may consume less power than performing channel scanning operations, and performing channel scanning operations may provide more accurate channel information, a device can balance the operations based on its needs. For example, the device may use local scanning more frequently than obtaining channel maps from nearby devices if it needs more accurate channel information. Further, a device may obtain channel maps from nearby devices more frequently than performing local scanning if it needs to save power.

In order to reduce power consumption, the primary device also may send out channel information only when it detects a sufficient difference from the previously shared channel information. For example, the primary device may compare newly detected channel information to previously detected channel information and send updated channel information only if a change exceeds a predetermined threshold. The primary device also may share channel information whenever it detects that a new device has entered the same location as the primary device. In some embodiments, in order to maintain the relevance (e.g., freshness) of channel information, the primary device may send out the channel information at least once per a specified maximum channel update period.

Figure 6:
FIG. 6 illustrates an example procedure for sharing a channel map in accordance with some embodiments.
Figure 6:
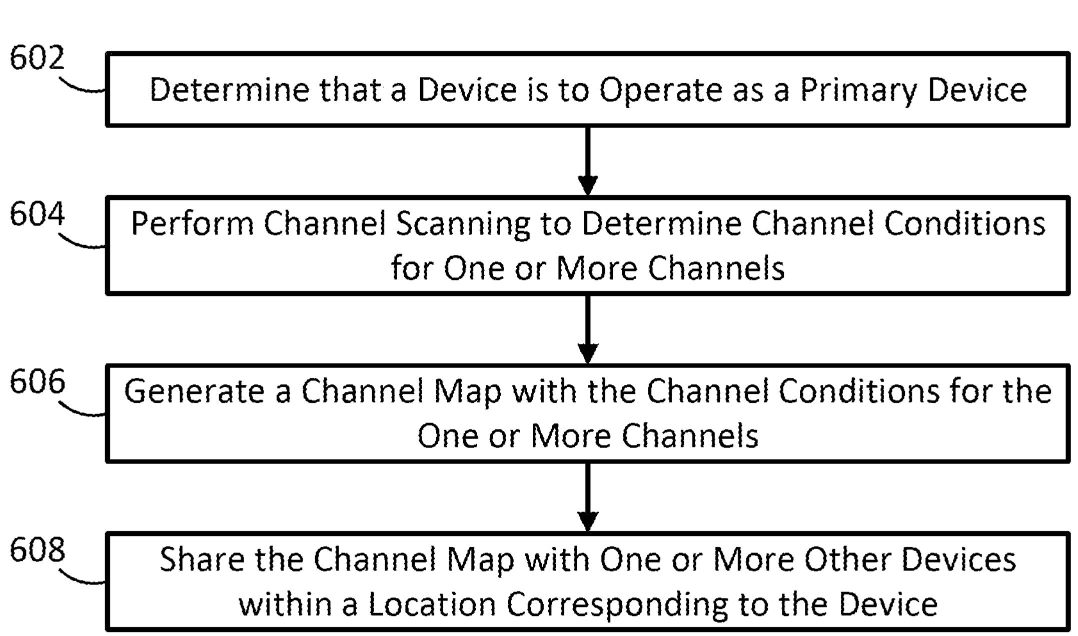

FIG. 6 illustrates an example procedure 600 for sharing a channel map in accordance with some embodiments. The procedure 600 may be performed by a device, such as devices described in relation to the system arrangement 100 (FIG. 1), the first device 202 (FIG. 2), the second device 204 (FIG. 2), the third device 206 (FIG. 2), the fourth device 208 (FIG. 2), the first device 302 (FIG. 3), the second device 304 (FIG. 3), the third device 306 (FIG. 3), the fourth device 308 (FIG. 3), the first device 402 (FIG. 4), the second device 404 (FIG. 4), the third device 406 (FIG. 4), the fourth device 408 (FIG. 4), the first device 502 (FIG. 5), the second device 504 (FIG. 5), the third device 506 (FIG. 5), and/or the fourth device 508 (FIG. 5). The procedure 600 may be performed as part of a process of sharing a channel map, or some portion thereof, with one or more other devices.

In 602, the device may determine that the device is to operate as a primary device. For example, the device may determine that it is to operate as a primary device based at least in part on one or more characteristics of the device. In some embodiments, the one or more characteristics utilized to determine that the device is to operate as the primary device may include a processor/chip revision (or version) for the device, a battery level status for the device, a power source for the device, and/or operator-selectable settings status (such as a current mode of operation of the device, including battery power mode and/or game mode) for the device.

In some embodiments, to determine the device is to operate as the primary device may include determining a ranking for the device based at least in part on the one or more characteristics of the device. Further, the device may determine rankings for the one or more other devices based at least in part on one or more characteristics of the one or more other devices. In some embodiments, the device may determine the rankings for the device and the other devices in accordance with approach for determining rankings described in relation to the system signaling arrangement 300 (FIG. 3). Additionally, to determine the device is to operate as the primary device may include determining that the device is to operate as the primary device based at least in part on the ranking for the device being higher than the rankings for the one or more other devices.

In 604, the device may perform channel scanning to determine channel conditions for one or more channels. For example, the device may perform channel scanning based at least in part on the determination that the device is to operate as the primary device. The device may perform one or more channel scanning operations (as described throughout this disclosure) as part of the channel scanning.

In 606, the device may generate a channel map indicating channel conditions for the one or more channels. For example, the channel map can be generated based on one or more channel condition values obtained through the channel scanning of 604.

In 608, the device may share the channel map with one or more other devices, e.g., within a location corresponding to the device. For example, the device may share the channel map generated in 606 with one or more other devices that are within the effective communication range of the device or satisfy a proximity condition. The one or more other devices may utilize the channel map, e.g., for determination of a particular channel of the one or more channels to utilize for connection establishment, data transfer, and/or reconnection.

In some embodiments, sharing the channel map may include transmitting at least a portion of the channel map, e.g., within an advertisement packet. In other embodiments, the channel map can be transmitted in conjunction with other information in a different type, or can be transmitted in a dedicated packet. The advertisement packet may include an advertisement, such as the first advertisement 416 (FIG. 4), the second advertisement 418 (FIG. 4), the third advertisement 420 (FIG. 4), the fourth advertisement 422 (FIG. 4), the first advertisement 520 (FIG. 5), the second advertisement 522 (FIG. 5), and/or the third advertisement 524 (FIG. 5). In some of these embodiments, the at least the portion of the channel map is limited to information related to alarming channels.

In some embodiments, the device may be a first device and the one or more other devices may include a second device. In these embodiments, sharing the channel map with the one or more other devices may include sharing the channel map with the second device as part of a connection between the first device and the second device. In some of these embodiments, sharing the channel map with the device as part of the connection may include sharing the channel map as part of connection establishment between the first device and the second device. The channel map may be shared in a connect indication (such as the connect indication 510 (FIG. 5) and/or the connect indication 518 (FIG. 5)) transmitted between the first device and the second device.

Although FIG. 6 is described with respect to an order of the operations of the procedure 600, it should be understood that one or more of the operations may be performed in a different order and/or one or more of the operations may be performed concurrently in other embodiments. Further, it should be understood that one or more operations may be omitted from the procedure 600 and/or one or more additional operations may be included in the procedure in other embodiments.

Figure 7:
FIG. 7 illustrates an example procedure for determining a channel to be utilized for a connection in accordance with some embodiments.
Figure 7:
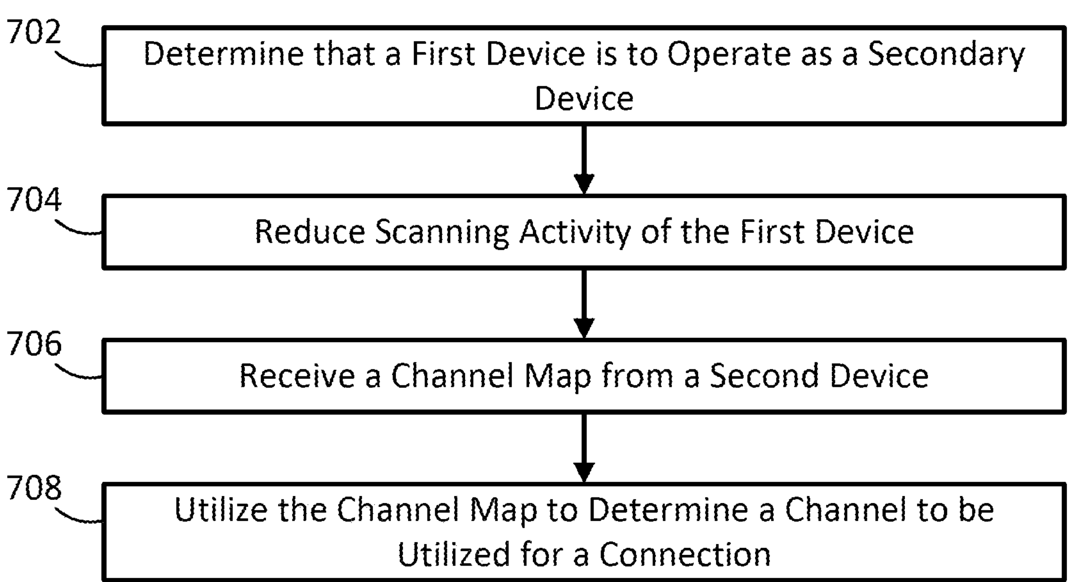

FIG. 7 illustrates an example procedure 700 for determining a channel to be utilized for connection establishment, data transfer, and/or reconnection in accordance with some embodiments. The procedure 700 may be performed by a first device, such as devices described in relation to the system arrangement 100 (FIG. 1), the first device 202 (FIG. 2), the second device 204 (FIG. 2), the third device 206 (FIG. 2), the fourth device 208 (FIG. 2), the first device 302 (FIG. 3), the second device 304 (FIG. 3), the third device 306 (FIG. 3), the fourth device 308 (FIG. 3), the first device 402 (FIG. 4), the second device 404 (FIG. 4), the third device 406 (FIG. 4), the fourth device 408 (FIG. 4), the first device 502 (FIG. 5), the second device 504 (FIG. 5), the third device 506 (FIG. 5), and/or the fourth device 508 (FIG. 5). The procedure 700 may be performed as part of a process of determining a channel for a connection using a shared channel map, or some portion thereof, received from another device.

In 702, the first device may determine that the first device is to operate as a secondary device, e.g., based at least in part on one or more characteristics of the first device. Further, the first device may determine that it is to operate as a secondary device based on the first device not being selected to operate as primary device. In some embodiments, the first device may determine it is to operate as a secondary device based at least in part on the ranking approach described in relation to the system signaling arrangement 300 (FIG. 3).

In 704, the first device may reduce its scanning activity. For example, the first device may reduce its scanning activity based at least in part on a determination that it is to operate as a secondary device. In some embodiments, reducing the scanning activity may include reducing a frequency at which the first device performs channel scanning operations (such as the first channel scanning operation 410 (FIG. 4), the second channel scanning operation 412 (FIG. 4), the third channel scanning operation 414 (FIG. 4), the first channel scanning operation 512 (FIG. 5), the second channel scanning operation 514 (FIG. 5), and/or the third channel scanning operation 516 (FIG. 5)). The first device may reduce the frequency of the channel scanning operations to a lower frequency than if the first device was not determined to operate as a secondary device and/or the first device was determined to operate as a primary device.

In some embodiments, reducing the scanning activity may include stopping all channel scanning activity of the first device. For example, while operating as a secondary device, the first device may not perform any channel scanning operations (such as the first channel scanning operation 410, the second channel scanning operation 412, the third channel scanning operation 414, the first channel scanning operation 512, the second channel scanning operation 514, and/or the third channel scanning operation 516).

In 706, the first device may receive a channel map from a second device. In some embodiments, the first device may determine to receive the channel map from the second device based at least in part on one or more conditions of the first device. The second device may be located within a location corresponding to the first device (e.g., within an effective communication range or within predefined proximity). In some embodiments, the second device may be outside of the location corresponding to the first device, within the location corresponding to the first device, or any combination thereof.

In some embodiments, receiving the channel map may include receiving the channel map in a packet, such as an advertising packet transmitted by the second device. For example, the second device may transmit one or more advertisement packets (such as the first advertisement 416 (FIG. 4), the second advertisement 418 (FIG. 4), the third advertisement 420 (FIG. 4), the fourth advertisement 422 (FIG. 4), the first advertisement 520 (FIG. 5), the second advertisement 522 (FIG. 5), and/or the third advertisement 524 (FIG. 5)) that includes the channel map. The first device may receive an advertisement from the second device and identify the channel map in the advertisement. In some of these embodiments, the channel map may include channel condition information for alarming channels. In some embodiments, a packet can include a partial channel map or a subset of channel map information.

In some embodiments, receiving the channel map may include receiving the channel map in a connect indication transmitted by the second device. For example, the second device may transmit a connect indication (such as the connect indication 510 (FIG. 5) and/or the connect indication 518 (FIG. 5)) to the first device to establish a connection with the first device. The first device may receive and identify the channel map in the connect indication.

In some embodiments, the first device may perform one or more channel scanning operations in addition to receiving the channel map from the second device. The one or more channel scanning operations performed by the first device may produce channel condition information that can be utilized for determining a channel to be used for connection establishment, data transfer, and/or reconnection in combination with the channel map received from the second device.

In 708, the first device may utilize the channel map (e.g., received in 706) to determine a channel to be utilized for a connection, including for connection establishment, data transfer, and/or reconnection.

In some embodiments, the channel map may be a first channel map. The first channel map may be received via a peripheral connection. For example, the channel map may be received by the first device as part of a peripheral role of the first device, where the peripheral connection is established via the second connection connecting with the first device. The channel map may be provided in a connect indication (such as the connect indication 510 and/or the connect indication 518) utilized for the peripheral connection. In some of these embodiments, the first device may receive a second channel map via a packet, such as in an advertisement packet (such as the first advertisement 416, the second advertisement 418, the third advertisement 420, the fourth advertisement 422, the first advertisement 520, the second advertisement 522, and/or the third advertisement 524). The device may assign one or more weights to the first channel map and/or the second channel map, e.g., based at least in part on an order in which the first channel map and the second channel map are received. In some embodiments, the first channel map and the second channel map may be used in accordance with the one or more assigned weights to determine a channel to be utilized for a connection, such as for connection establishment, data transfer, or reconnection.

In some embodiments, the first device may perform a scanning operation to determine channel conditions for one or more channels. For example, the first device may perform a channel scanning operation, such as the first channel scanning operation 410, the second channel scanning operation 412, the third channel scanning operation 414, the first channel scanning operation 512, the second channel scanning operation 514, and/or the third channel scanning operation 516. The first device may assign a first weight to the channel map and a second weight to the channel conditions, where the second weight may be greater than the first weight. In some embodiments, the second weight assigned to the channel conditions may be greater than the first weight assigned to the channel map due to the channel weights being produced by channel scanning operations performed by the first device rather than being received from another device, such as the channel map being received from the second device. In some embodiments, the first weight assigned to the channel map received from the second device may be determined based on a distance (or an estimated distance) between the first device and the second device. In some of these embodiments, the channel map may be a first channel map and the first device may generate a second channel map from the channel conditions, where the first weight is assigned to the first channel map and the second weight is assigned to the second channel map. In these embodiments, to utilize the channel map to determine the channel may include to utilize the first weight with the channel map and the second weight with the channel conditions to determine the channel to be utilized for connection.

Although FIG. 7 is described with respect to an order of the operations of the procedure 700, it should be understood that one or more of the operations may be performed in a different order and/or one or more of the operations may be performed concurrently in other embodiments. Further, it should be understood that one or more operations may be omitted from the procedure 700 and/or one or more additional operations may be included in the procedure in other embodiments.

Figure 8:
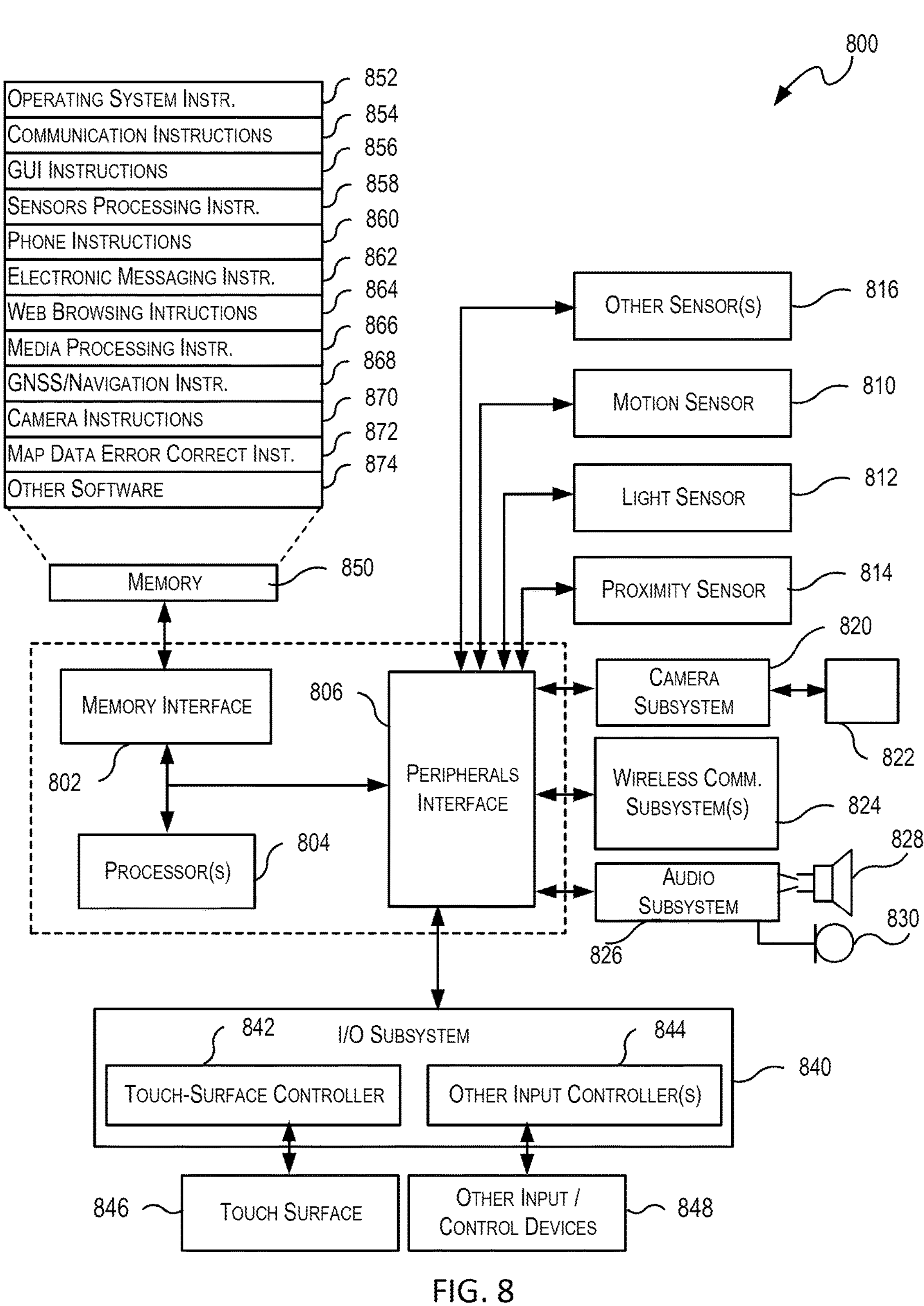
FIG. 8 is a block diagram of an example computing device that can implement the features and processes of FIGS. 1-7 in accordance with some embodiments.

FIG. 8 is a block diagram of an example computing device 800 that can implement the features and processes of FIGS. 1-7 in accordance with some embodiments. The computing device 800 is an example of the first device 302 (FIG. 3), the second device 304 (FIG. 3), the third device 306 (FIG. 3), the fourth device 308 (FIG. 3), the first device 402 (FIG. 4), the second device 404 (FIG. 4), the third device 406 (FIG. 4), the fourth device 408 (FIG. 4), the first device 502 (FIG. 5), the second device 504 (FIG. 5), the third device 506 (FIG. 5), and/or the fourth device 508 (FIG. 5). The computing device 800 can include a memory interface 802, one or more data processors, image processors and/or central processing units 804, and a peripherals interface 806. The memory interface 802, the one or more processors 804 and/or the peripherals interface 806 can be separate components or can be integrated in one or more integrated circuits. The various components in the computing device 800 can be coupled by one or more communication buses or signal lines.

[0001] 1[0001] 1[0001] 1[0001] Sensors, devices, and subsystems can be coupled to the peripherals interface 806 to facilitate multiple functionalities. For example, a motion sensor 810, a light sensor 812, and a proximity sensor 814 can be coupled to the peripherals interface 806 to facilitate orientation, lighting, and proximity functions. Other sensors 816 can also be connected to the peripherals interface 806, such as a global navigation satellite system (GNSS) (e.g., GPS receiver), a temperature sensor, a biometric sensor, magnetometer or other sensing device, to facilitate related functionalities.

A camera subsystem 820 and an optical sensor 822 (e.g., a charged coupled device (CCD) or a complementary metal-oxide semiconductor (CMOS) optical sensor) can be utilized to facilitate camera functions, such as recording photographs and video clips.

Communication functions can be facilitated through one or more wireless communication subsystems 824, which can include radio frequency receivers and transmitters and/or optical (e.g., infrared) receivers and transmitters. The specific design and implementation of the communication subsystem 824 can depend on the communication network(s) over which the computing device 800 is intended to operate. For example, the computing device 800 can include communication subsystems 824 designed to operate over a GSM network, a GPRS network, an EDGE network, a Wi-Fi or WiMax network, and a Bluetooth™ network.

An audio subsystem 826 can be coupled to a speaker 828 and a microphone 830 to facilitate voice-enabled functions, such as speaker recognition, voice replication, digital recording, and telephony functions. The audio subsystem 826 can be configured to facilitate processing voice commands, voice printing and voice authentication, for example.

The I/O subsystem 840 can include a touch-surface controller 842 and/or other input controller(s) 844. The touch-surface controller 842 can be coupled to a touch surface 846. The touch surface 846 and touch-surface controller 842 can, for example, detect contact and movement or break thereof using any of a plurality of touch sensitivity technologies, including, but not limited to, capacitive, resistive, infrared, and surface acoustic wave technologies, as well as other proximity sensor arrays or other elements for determining one or more points of contact with the touch surface 846.

The other input controller(s) 844 can be coupled to other input/control devices 848, such as one or more buttons, rocker switches, thumbwheel, infrared port, USB port, and/or a pointer device such as a stylus. The one or more buttons (not shown) can include an up/down button for volume control of the speaker 828 and/or the microphone 830.

In one implementation, a pressing of the button for a first duration can disengage a lock of the touch surface 846; and a pressing of the button for a second duration that is longer than the first duration can turn power to the computing device 800 on or off. Pressing the button for a third duration can activate a voice control, or voice command, module that enables the user to speak commands into the microphone 830 to cause the device to execute the spoken command. The user can customize a functionality of one or more of the buttons. The touch surface 846 can, for example, also be used to implement virtual or soft buttons and/or a keyboard.

In some examples, the computing device 800 can present recorded audio and/or video files, such as MP3, AAC, and MPEG files. In some examples, the computing device 800 can include the functionality of an MP3 player, such as an iPod™.

The memory interface 802 can be coupled to memory 850. The memory 850 can include high-speed random-access memory and/or non-volatile memory, such as one or more magnetic disk storage devices, one or more optical storage devices, and/or flash memory (e.g., NAND, NOR). The memory 850 can store an operating system 852, such as Darwin, RTXC, LINUX, UNIX, OS X, WINDOWS, or an embedded operating system such as VxWorks.

The operating system 852 can include instructions for handling basic system services and for performing hardware dependent tasks. In some examples, the operating system 852 can be a kernel (e.g., UNIX kernel). In some examples, the operating system 852 can include instructions for performing channel map sharing. For example, operating system 852 can implement the channel map sharing features as described with reference to FIGS. 1-7.

The memory 850 can also store communication instructions 854 to facilitate communicating with one or more additional devices, one or more computers and/or one or more servers. The memory 850 can include graphical user interface instructions 856 to facilitate graphic user interface processing; sensor processing instructions 858 to facilitate sensor-related processing and functions; phone instructions 860 to facilitate phone-related processes and functions; electronic messaging instructions 862 to facilitate electronic-messaging related processes and functions; web browsing instructions 864 to facilitate web browsing-related processes and functions; media processing instructions 866 to facilitate media processing-related processes and functions; GNSS/Navigation instructions 868 to facilitate GNSS and navigation-related processes and instructions; and/or camera instructions 870 to facilitate camera-related processes and functions.

The memory 850 can store software instructions 872 to facilitate other processes and functions, such as the channel map sharing processes and functions as described with reference to FIGS. 1-7.

The memory 850 can also store other software instructions 874, such as web video instructions to facilitate web video-related processes and functions; and/or web shopping instructions to facilitate web shopping-related processes and functions. In some examples, the media processing instructions 866 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 850 can include additional instructions or fewer instructions. Furthermore, various functions of the computing device 800 can be implemented in hardware and/or in software, including in one or more signal processing and/or application specific integrated circuits.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In some examples, "circuitry" can refer to, be part of, or include hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radiofrequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or," unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The specific details of particular embodiments may be combined in any suitable manner or varied from those shown and described herein without departing from the spirit and scope of embodiments of the described techniques.

The above description of example embodiments of the described techniques has been presented for the purposes of illustration and description. It is not intended to be exhaustive or to limit the described techniques to the precise form described, and many modifications and variations are possible in light of the teaching above. The embodiments were chosen and described in order to best explain the principles of the described techniques and its practical applications to thereby enable others skilled in the art to best utilize the described techniques in various embodiments and with various modifications as are suited to the particular use contemplated.

All publications, patents, and patent applications cited herein are hereby incorporated by reference in their entirety for all purposes.

EXAMPLES

In the following sections, further example embodiments are provided.

Example 1 may include one or more non-transitory computer-readable media having instructions that, when executed by one or more processors of a device, configure the device to determine that the device is to operate as a primary device based at least in part on a characteristic of the device, perform a channel scanning operation to determine one or more channel conditions associated with one or more channels, generate a channel map indicating the one or more channel conditions, and send the channel map to a second device proximate to the device, the channel map comprising a channel that can be utilized for a connection with the device.

Example 2 may include the one or more non-transitory computer-readable media of example 1, wherein sending the channel map comprises transmitting at least a portion of the channel map within an advertisement packet.

Example 3 may include the one or more non-transitory computer-readable media of example 2, wherein the at least the portion of the channel map comprises information indicating a channel that should not be used.

Example 4 may include the one or more non-transitory computer-readable media of example 1, wherein the device sends the channel map to the second device as part of a connection establishment operation.

Example 5 may include the one or more non-transitory computer-readable media of example 4, wherein sending the channel map as part of the connection establishment operation comprises sending the channel map in a connect indication transmitted to the second device.

Example 6 may include the one or more non-transitory computer-readable media of example 1, wherein the characteristic comprises a processor revision, a battery level status, a power source associated with the device, or an operator-selectable setting associated with the device.

Example 7 may include the one or more non-transitory computer-readable media of example 1, wherein determining that the device is to operate as the primary device further comprises determining, by the device, a ranking based at least in part on the characteristic, determining, by the device, a ranking for the second device based at least in part on a characteristic of the second device, and determining that the ranking exceeds the ranking for the second device.

Example 8 may include a method of sharing a channel map with a second device, comprising determining, by a device, that the device is to operate as a primary device based at least in part on a characteristic of the device, performing, by the device, a channel scanning operation to determine one or more channel conditions associated with one or more channels, generating, by the device, a channel map indicating the one or more channel conditions, and sending, by the device, the channel map to a second device proximate to the device, the channel map comprising a channel that can be utilized for a connection with the device.

Example 9 may include the method of example 8, wherein sending the channel map comprises transmitting at least a portion of the channel map within an advertisement packet.

Example 10 may include the method of example 9, wherein the at least the portion of the channel map comprises information indicating a channel that should not be used.

Example 11 may include the method of example 8, wherein the device sends the channel map to the second device as part of a connection establishment operation.

Example 12 may include the method of example 11, wherein sending the channel map as part of the connection establishment operation comprises sending the channel map in a connect indication transmitted to the second device.

Example 13 may include the method of example 8, wherein the characteristic comprises a processor revision, a battery level status, a power source associated with the device, or an operator-selectable setting associated with the device.

Example 14 may include the method of example 8, wherein determining that the device is to operate as the primary device further comprises determining, by the device, a ranking based at least in part on the characteristic, determining, by the device, a ranking for the second device based at least in part on a characteristic of the second device, and determining that the ranking exceeds the ranking for the second device.

Example 15 may include a device, comprising memory to store a channel map, and one or more processors coupled to the memory, the one or more processors configured to determine that the device is to operate as a primary device based at least in part on a characteristic of the device, perform a channel scanning operation to determine one or more channel conditions associated with one or more channels, generate the channel map indicating the one or more channel conditions, and send the channel map to a second device proximate to the device, the channel map comprising a channel that can be utilized for a connection with the device.

Example 16 may include the device of example 15, wherein sending the channel map comprises transmitting at least a portion of the channel map within an advertisement packet.

Example 17 may include the device of example 16, wherein the at least the portion of the channel map comprises information indicating a channel that should not be used.

Example 18 may include the device of example 15, wherein the device sends the channel map to the second device as part of a connection establishment operation.

Example 19 may include the device of example 18, wherein sending the channel map as part of the connection establishment operation comprises sending the channel map in a connect indication transmitted to the second device.

Example 20 may include the device of example 15, wherein the characteristic comprises a processor revision, a battery level status, a power source associated with the device, or an operator-selectable setting associated with the device.

Example 21 may include one or more non-transitory computer-readable media having instructions that, when executed by one or more processors of a device, configure the device to determine that the device is to operate as a primary device based at least in part on characteristics of the device, perform channel scanning to determine channel conditions for one or more channels based at least in part on the determination that the device is to operate as the primary device, generate a channel map with the channel conditions for the one or more channels, and share the channel map with one or more other devices within a location corresponding to the device, the one or more other devices to utilize the channel map for determination of a particular channel of the one or more channels to utilize for a connection.

Example 22 may include the one or more non-transitory computer-readable media of example 21, wherein to share the channel map includes to transmit at least a portion of the channel map within an advertisement packet.

Example 23 may include the one or more non-transitory computer-readable media of example 22, wherein the at least the portion of the channel map is limited to information related to alarming channels.

Example 24 may include the one or more non-transitory computer-readable media of example 21, wherein the device is a first device, wherein the one or more other devices includes a second device, and wherein to share the channel map with the one or more other devices includes to share the channel map with the second device as part of a connection between the first device and the second device.

Example 25 may include the one or more non-transitory computer-readable media of example 24, wherein to share the channel map with the second device as part of the connection includes to share the channel map as part of connection establishment between the first device and the second device, and wherein the channel map is shared in a connect indication transmitted between the first device and the second device.

Example 26 may include the one or more non-transitory computer-readable media of example 21, wherein the characteristics utilized to determine that the device is to operate as the primary device include a processor/chip revision for the device, a battery level status for the device, a power source for the device, or operator-selectable settings statuses for the device.

Example 27 may include the one or more non-transitory computer-readable media of example 21, wherein to determine the device is to operate as the primary device includes to determine a ranking for the device based at least in part on the characteristics of the device, determine rankings for the one or more other devices based at least in part on characteristics of the one or more other devices, and determine that the device is to operate as the primary device based at least in part on the ranking for the device being higher than the rankings for the one or more other devices.

Example 28 may include a method of sharing a channel map with one or more other devices, comprising determining, by a device, that the device is to operate as a primary device based at least in part on characteristics of the device, performing, by the device, channel scanning to determine channel conditions for one or more channels based at least in part on the determination that the device is to operate as the primary device, generating, by the device, the channel map with the channel conditions for the one or more channels, and sharing, by the device, the channel map with the one or more other devices within a location corresponding to the device, the one or more other devices to utilize the channel map for determination of a particular channel of the one or more channels to utilize for a connection.

Example 29 may include the method of example 28, wherein sharing the channel map includes transmitting at least a portion of the channel map within an advertisement packet.

Example 30 may include the method of example 29, wherein the at least the portion of the channel map is limited to information related to alarming channels.

Example 31 may include the method of example 28, wherein the device is a first device, wherein the one or more other devices includes a second device, and wherein sharing the channel map with the one or more other devices includes sharing the channel map with the second device as part of a connection between the first device and the second device.

Example 32 may include the method of example 31, wherein sharing the channel map with the second device as part of the connection includes sharing the channel map as part of connection establishment between the first device and the second device, and wherein the channel map is shared in a connect indication transmitted between the first device and the second device.

Example 33 may include the method of example 28, wherein the characteristics utilized to determine that the device is to operate as the primary device include a processor/chip revision for the device, a battery level status for the device, a power source for the device, or operator-selectable settings statuses for the device.

Example 34 may include the method of example 28, wherein determining the device is to operate as the primary device includes determining a ranking for the device based at least in part on the characteristics of the device, determining rankings for the one or more other devices based at least in part on characteristics of the one or more other devices, and determining that the device is to operate as the primary device based at least in part on the ranking for the device being higher than the rankings for the one or more other devices.

Example 35 may include a device, comprising memory to store a channel map, and one or more processors coupled to the memory, the one or more processors configured to determine that the device is to operate as a primary device based at least in part on characteristics of the device, perform channel scanning to determine channel conditions for one or more channels based at least in part on the determination that the device is to operate as the primary device, generate the channel map with the channel conditions for the one or more channels, and share the channel map with one or more other devices within a location corresponding to the device, the one or more other devices to utilize the channel map for determination of a particular channel of the one or more channels to utilize for a connection.

Example 36 may include the device of example 35, wherein to share the channel map includes to transmit at least a portion of the channel map within an advertisement packet.

Example 37 may include the device of example 36, wherein the at least the portion of the channel map is limited to information related to alarming channels.

Example 38 may include the device of example 35, wherein the device is a first device, wherein the one or more other devices includes a second device, and wherein to share the channel map with the one or more other devices includes to share the channel map with the second device as part of a connection between the first device and the second device.

Example 39 may include the device of example 38, wherein to share the channel map with the second device as part of the connection includes to share the channel map as part of connection establishment between the first device and the second device, and wherein the channel map is shared in a connect indication transmitted between the first device and the second device.

Example 40 may include the device of example 35, wherein the characteristics utilized to determine that the device is to operate as the primary device include a processor/chip revision for the device, a battery level status for the device, a power source for the device, or operator-selectable settings statuses for the device.

Example 41 may include one or more non-transitory computer-readable media having instructions that, when executed by one or more processors of a first device, configure the first device to determine that the first device is to operate as a secondary device based at least in part on characteristics of the first device, reduce scanning activity of the first device based at least in part on the determination that the first device is to operate as the secondary device, receive a channel map from a second device, and utilize the channel map to determine a channel to be utilized for a connection.

Example 42 may include the one or more non-transitory computer-readable media of example 41, wherein to receive the channel map includes to receive the channel map in an advertising packet transmitted by the second device.

Example 43 may include the one or more non-transitory computer-readable media of example 42, wherein the channel map includes channel condition information for alarming channels.

Example 44 may include the one or more non-transitory computer-readable media of example 41, wherein to receive the channel map includes to receive the channel map in a connect indication transmitted by the second device.

Example 45 may include the one or more non-transitory computer-readable media of example 41, wherein to reduce scanning activity includes to stop all scanning activity of the first device.

Example 46 may include the one or more non-transitory computer-readable media of example 41, wherein the channel map is a first channel map, wherein the first channel map is received via a peripheral connection, and wherein the instructions, when executed by the one or more processors, configure the first device to receive a second channel map via an advertisement package, and assign weights to the first channel map and the second channel map based at least in part on an order in which the first channel map and the second channel map are received, wherein to utilize the first channel map to determine the channel includes to utilize the first channel map with the weights and the second channel map to determine the channel to be utilized for the connection.

Example 47 may include the one or more non-transitory computer-readable media of example 41, wherein the instructions, when executed by the one or more processors, configure the first device to perform a scanning operation to determine channel conditions for one or more channels, and assign a first weight to the channel map and a second weight to the channel conditions, the second weight being greater than the first weight, wherein to utilize the channel map to determine the channel includes to utilize the first weight with the channel map and the second weight with the channel conditions to determine the channel to be utilized for the connection.

Example 48 may include the one or more non-transitory computer-readable media of example 41, wherein the instructions, when executed by the one or more processors, configure the first device to determine to receive the channel map from the second device based at least in part on one or more conditions of the first device.

Example 49 may include a method of determining a channel to be utilized for a connection, comprising determining, by a first device, that the first device is to operate as a secondary device based at least in part on characteristics of the first device, reducing, by the first device, scanning activity of the first device based at least in part on the determination that the first device is to operate as the secondary device, receiving, by the first device, a channel map from a second device, and utilizing, by the first device, the channel map to determine the channel to be utilized for the connection.

Example 50 may include the method of example 49, wherein receiving the channel map includes receiving the channel map in an advertising packet transmitted by the second device.

Example 51 may include the method of example 50, wherein the channel map includes channel condition information for alarming channels.

Example 52 may include the method of example 49, wherein receiving the channel map includes receiving the channel map in a connect indication transmitted by the second device.

Example 53 may include the method of example 49, wherein reducing scanning activity includes stopping all scanning activity of the first device.

Example 54 may include the method of example 49, wherein the channel map is a first channel map, wherein the first channel map is received via a peripheral connection, and wherein the method comprises receiving a second channel map via an advertisement package, and assigning weights to the first channel map and the second channel map based at least on an order in which the first channel map and the second channel map are received, wherein utilizing the first channel map to determine the channel includes utilizing the first channel map with the weights and the second channel map to determine the channel to be utilized for the connection.

Example 55 may include the method of example 49, comprising performing a scanning operation to determine channel conditions for one or more channels, and assigning a first weight to the channel map and a second weight to the channel conditions, the second weight being greater than the first weight, wherein to utilize the channel map to determine the channel includes to utilize the first weight with the channel map and the second weight with the channel conditions to determine the channel to be utilized for the connection.

Example 56 may include the method of example 49, comprising determining to receive the channel map from the second device based at least in part on one or more conditions of the first device.

Example 57 may include a first device, comprising memory to store a channel map, and one or more processors coupled to the memory, the one or more processors to determine that the first device is to operate as a secondary device based at least in part on characteristics of the first device, reduce scanning activity of the first device based at least in part on the determination that the first device is to operate as the secondary device, receive the channel map from a second device, and utilize the channel map to determine a channel to be utilized for a connection.

Example 58 may include the first device of example 57, wherein to receive the channel map includes to receive the channel map in an advertising packet transmitted by the second device.

Example 59 may include the first device of example 58, wherein the channel map includes channel condition information for alarming channels.

Example 60 may include the first device of example 57, wherein to receive the channel map includes to receive the channel map in a connect indication transmitted by the second device.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors of a device, configure the device to:

determine that the device is to operate as a primary device based at least in part on a characteristic of the device;

perform a channel scanning operation to determine one or more channel conditions associated with one or more channels;

determine that a difference between the one or more channel conditions and corresponding previous one or more channel conditions associated with the one or more channels exceeds a threshold, the corresponding previous one or more channel conditions being indicated by a previous channel map;

generate a channel map indicating channel information associated with the one or more channels based at least in part on the determination that the difference exceeds the threshold, the channel information determined based at least in part on the channel scanning operation; and send the channel map to a second device proximate to the device, the channel map indicating a channel or a set of channels that can be utilized for connection establishment, data transfer, or reconnection with the device.

2. The one or more non-transitory computer-readable media of claim 1, wherein to send the channel map comprises to transmit at least a portion of the channel map within an advertisement packet.

3. The one or more non-transitory computer-readable media of claim 2, wherein the at least the portion of the channel map comprises information indicating a channel that should not be used.

4. The one or more non-transitory computer-readable media of claim 1, wherein the device sends the channel map to the second device as part of a connection establishment operation.

5. The one or more non-transitory computer-readable media of claim 4, wherein sending the channel map as part of the connection establishment operation comprises sending the channel map in a connect indication transmitted to the second device.

6. The one or more non-transitory computer-readable media of claim 1, wherein the characteristic comprises a processor revision, a battery level status, a power source associated with the device, or an operator-selectable setting associated with the device.

7. The one or more non-transitory computer-readable media of claim 1, wherein to determine that the device is to operate as the primary device further comprises to:

determine, by the device, a ranking based at least in part on the characteristic;

determine, by the device, a ranking for the second device based at least in part on a characteristic of the second device; and determine, by the device, that the ranking exceeds the ranking for the second device.

8. The one or more non-transitory computer-readable media of claim 1, wherein the instructions, when executed by the one or more processors, further configure the device to:

receive a second channel map from a third device proximate to the device, the second channel map indicating one or more channel conditions; and determine the channel information of the channel map based at least in part on the one or more channel conditions associated with the one or more channels and a weighted version of the one or more channel conditions indicated by the second channel map.

9. A method of sharing a channel map with a second device, comprising:

determining, by a device, that the device is to operate as a primary device based at least in part on a characteristic of the device;

performing, by the device, a channel scanning operation to determine one or more channel conditions associated with one or more channels;

determining that a difference between the one or more channel conditions and corresponding previous one or more channel conditions associated with the one or more channels exceeds a threshold, the corresponding previous one or more channel conditions being indicated by a previous channel map;

generating, by the device, a channel map indicating channel information associated with the one or more channels based at least in part on the determination that the difference exceeds the threshold, the channel information determined based at least in part on the channel scanning operation; and sending, by the device, the channel map to a second device proximate to the device, the channel map indicating a channel or a set of channels that can be utilized for connection establishment, data transfer, or reconnection with the device.

10. The method of claim 9, wherein sending the channel map comprises transmitting at least a portion of the channel map within an advertisement packet.

11. The method of claim 10, wherein the at least the portion of the channel map comprises information indicating a channel that should not be used.

12. The method of claim 9, wherein the device sends the channel map to the second device as part of a connection establishment operation.

13. The method of claim 12, wherein sending the channel map as part of the connection establishment operation comprises sending the channel map in a connect indication transmitted to the second device.

14. The method of claim 9, wherein the characteristic comprises a processor revision, a battery level status, a power source associated with the device, or an operator-selectable setting associated with the device.

15. A device, comprising:

memory to store a channel map; and one or more processors coupled to the memory, the one or more processors configured to:

determine that the device is to operate as a primary device based at least in part on a characteristic of the device;

perform a channel scanning operation to determine one or more channel conditions associated with one or more channels;

determine that a difference between the one or more channel conditions and corresponding previous one or more channel conditions associated with the one or more channels exceeds a threshold, the corresponding previous one or more channel conditions being indicated by a previous channel map;

generate the channel map indicating channel information associated with the one or more channels based at least in part on the determination that the difference exceeds the threshold, the channel information determined based at least in part on the channel scanning operation; and send the channel map to a second device proximate to the device, the channel map indicating a channel or a set of channels that can be utilized for connection establishment, data transfer, or reconnection with the device.

16. The device of claim 15, wherein sending the channel map comprises transmitting at least a portion of the channel map within an advertisement packet.

17. The device of claim 16, wherein the at least the portion of the channel map comprises information indicating a channel that should not be used.

18. The device of claim 15, wherein the device sends the channel map to the second device as part of a connection establishment operation.

19. The device of claim 18, wherein sending the channel map as part of the connection establishment operation comprises sending the channel map in a connect indication transmitted to the second device.

20. The device of claim 15, wherein the characteristic comprises a processor revision, a battery level status, a power source associated with the device, or an operator-selectable setting associated with the device.

* * * * *